A. INGALLS.
Improvement in Corn and Cotton-Seed Planters.
No. 131,274.  Patented Sep. 10, 1872.
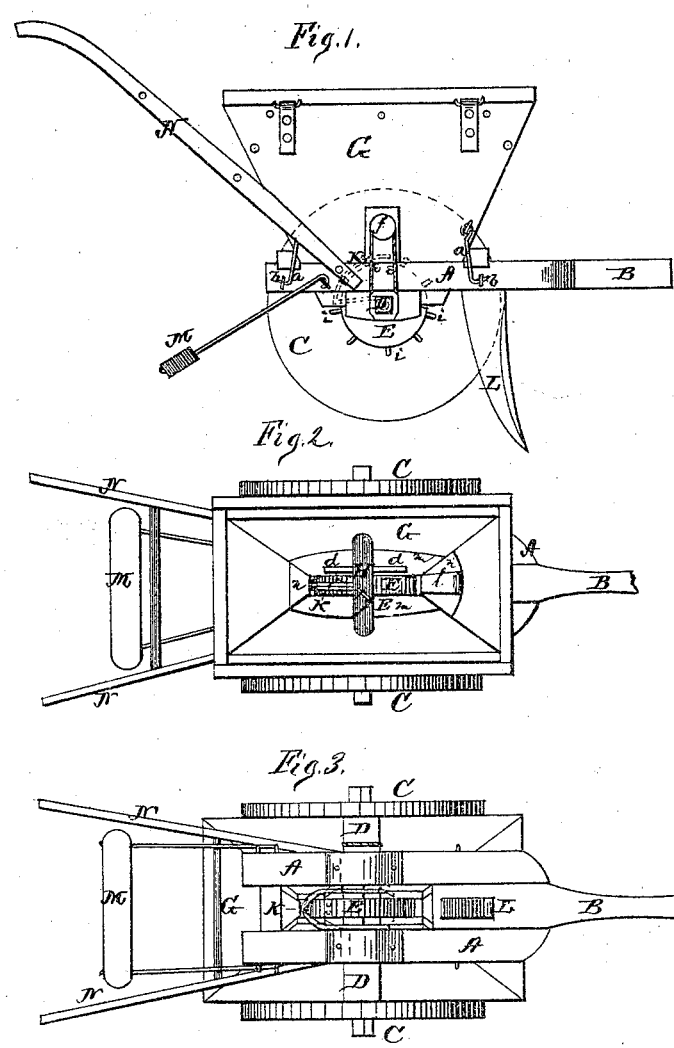

UNITED STATES PATENT OFFICE.

ALFRED INGALLS, OF MEMPHIS, TENNESSEE.

IMPROVEMENT IN CORN AND COTTON-SEED PLANTERS.

Specification forming part of Letters Patent No. 131,274, dated September 10, 1872.

*To all whom it may concern:*

Be it known that I, ALFRED INGALLS, of Memphis, in the county of Shelby and in the State of Tennessee, have invented certain new and useful Improvements in Cotton and Corn Planter; and do hereby declare that the following is a full, clear, and exact description thereof, reference being had to the accompanying drawing and to the letters of reference marked thereon making a part of this specification.

The nature of my invention consists in the construction and arrangement of a "cotton and corn planter," as will be hereinafter more fully set forth.

In order to enable others skilled in the art to which my invention appertains to make and use the same, I will now proceed to describe its construction and operation, referring to the annexed drawing, in which—

Figure 1 is a side elevation, Fig. 2 a plan view, and Fig. 3 a bottom view, of my machine.

A represents the frame, a part, B, of which extends forward, forming the tongue by which the machine is drawn. C C are the wheels upon which the machine runs, and are made fast to the axle D, thereby causing said axle to revolve with the wheels. E is a toothed wheel, fixed upon the axle D midway between the sides of the frame A. G is a hopper or seed-box, the smaller end of which is fitted into the frame A, and fastened to the same by means of hooks $a\ a$ and staples $b\ b$, the wheel E projecting up through the bottom of the hopper, thereby exposing a portion of its rim on the inner side of the box. H is a shaft passing through the hopper G, and provided with arms $d\ d$, which agitate the seed and prevent it from clogging. This shaft receives its motion from the axle D by means of the cord $e$ and pulleys $f$, as shown in Fig. 1. K is a curved slide, pivoted, by means of arms $h\ h$, to the axle D, the axle revolving in said arms. This slide may be so adjusted as to expose as much or little of that portion of the wheel E which projects into the hopper as is desired, thereby regulating the amount of seed delivered, or it can be closed entirely when necessary to move forward without planting. The wheel E is provided with teeth $i\ i$, as shown, and is used only to plant cotton-seed. In planting corn another wheel is substituted, which, instead of having teeth, is provided with cells, to carry the seed out of the hopper and drop it either in hills or drills, as may be desired. To make it drop the seed in bunches or hills I attach a curved bar or shield forward, which holds the seed in the cells until they arrive under the machine, and hence are bottom side up; and hence when the seed falls it all goes together. L is a small plow, in front, which opens the ground, and M is a curved bar or drag, which covers the seed and presses the earth smoothly over it. N N are the handles by which the operator holds the implement in position.

Having thus fully described my invention, what I claim as new, and desire to secure by Letters Patent, is—

The adjustable slide K, in combination with the shaft D, toothed wheel E, hopper G with slide $l$, and shaft H with arms $d\ d$, all substantially as set forth.

In testimony that I claim the foregoing I have hereunto set my hand this 17th day of May, 1872.

ALFRED INGALLS.

Witnesses:
CON. ROWLAND,
Z. C. ROWLAND.